US012623974B2

(12) United States Patent
Ford et al.

(10) Patent No.: US 12,623,974 B2
(45) Date of Patent: May 12, 2026

(54) METHOD OF MAKING A SHAPED TOOL COMPONENT

(71) Applicant: Element Six (UK) Limited, Oxfordshire (GB)

(72) Inventors: David Thomas Ford, Oxfordshire (GB); Douglas John Geekie, Oxfordshire (GB)

(73) Assignee: Element Six (UK) Limited, Oxfordshire (GB)

( * ) Notice: Subject to any disclaimer, the term of this patent is extended or adjusted under 35 U.S.C. 154(b) by 153 days.

(21) Appl. No.: 18/556,283

(22) PCT Filed: Apr. 5, 2022

(86) PCT No.: PCT/EP2022/058970
§ 371 (c)(1),
(2) Date: Oct. 19, 2023

(87) PCT Pub. No.: WO2022/223288
PCT Pub. Date: Oct. 27, 2022

(65) Prior Publication Data
US 2024/0182370 A1      Jun. 6, 2024

(30) Foreign Application Priority Data
Apr. 22, 2021    (GB) ...................................... 2105770

(51) Int. Cl.
*C04B 37/00*        (2006.01)
*C04B 41/00*        (2006.01)
*C04B 41/91*        (2006.01)
(52) U.S. Cl.
CPC ........ *C04B 37/001* (2013.01); *C04B 41/0072* (2013.01); *C04B 41/91* (2013.01);
(Continued)

(58) Field of Classification Search
CPC .... C04B 37/001; C04B 41/0072; C04B 41/91
See application file for complete search history.

(56) References Cited

U.S. PATENT DOCUMENTS 5,373,908 A      12/1994    Pastusek
2008/0145261 A1*   6/2008    Yong ..................... C22C 29/005
419/13
(Continued)

FOREIGN PATENT DOCUMENTS

CN        211874401 U      11/2020
EP        0706981 A2      4/1996
(Continued)

OTHER PUBLICATIONS

Combined Search and Examination Report Issued for Application No. GB2105770.8, dated Sep. 15, 2021 (7 pages).
(Continued)

*Primary Examiner* — James Sanders
(74) *Attorney, Agent, or Firm* — Armstrong Teasdale LLP

(57) ABSTRACT

This disclosure relates to a method of making a shaped tool component from a precursor sintered body comprising polycrystalline diamond (PCD). The sintered body has a PCD table joined to a substrate, and the PCD table varies in depth. The resulting shaped tool component thus also has a PCD layer with varying depth. A method of making a shaped tool component comprising polycrystalline diamond (PCD), comprising the steps: h. Adding a diamond feed stock to a refractory cup; i. Adding a p re-shaped cemented carbide body to the refractory cup adjacent the diamond feed stock; j. Compacting the diamond feed stock and cemented carbide body to form a green body; k. Sintering the green body at a temperature between 1400° C. to 2100° C. and at a pressure of at least 7 GPa, for at least 30 seconds to form a sintered
(Continued)

PCD precursor body that comprises a PCD table sinter-joined to the cemented carbide substrate at an interface.

19 Claims, 14 Drawing Sheets

(52) U.S. Cl.
CPC *C04B 2235/427* (2013.01); *C04B 2235/6567* (2013.01); *C04B 2235/658* (2013.01); *C04B 2235/94* (2013.01); *C04B 2237/363* (2013.01); *C04B 2237/401* (2013.01)

(56) References Cited

U.S. PATENT DOCUMENTS

| | | | |
|---|---|---|---|
| 2013/0016935 A1 | 1/2013 | Cooley et al. | |
| 2014/0144886 A1 | 5/2014 | Cooley et al. | |
| 2016/0311030 A1 | 10/2016 | Kondameedi et al. | |
| 2018/0036696 A1 | 2/2018 | Can et al. | |
| 2019/0337857 A1 | 11/2019 | Can et al. | |

FOREIGN PATENT DOCUMENTS

| | | | |
|---|---|---|---|
| EP | 3378586 | A1 | 9/2018 |
| JP | H07156003 | A | 6/1995 |
| JP | H08231281 | A | 9/1996 |
| JP | 11333604 | A | 12/1999 |
| JP | 2001150216 | A | 6/2001 |
| JP | 2013513031 | A | 4/2013 |
| JP | 2013136144 | A | 7/2013 |
| WO | 2011069637 | A1 | 6/2011 |
| WO | 2017086485 | A1 | 5/2017 |
| WO | 2018/088174 | A | 5/2018 |
| WO | 2020028663 | A1 | 2/2020 |

OTHER PUBLICATIONS

Combined Search and Examination Report Issued for Application No. GB2204967.0, dated Oct. 3, 2022 (7 pages).
Search Report and Written Opinion for International Application No. PCT/EP2022/058970, dated Jul. 4, 2022 (13 pages).

* cited by examiner

S1. Add a diamond feed stock to a refractory cup

S2. Compact the diamond feed stock to form a green body

S3. Sinter green body 1400°C – 2100°C, > 7GPa, at least 30 seconds to form a sintered PCD precursor body S4. Allow to cool S5. Slice into the sintered PCD precursor body to produce one or more sliced portions S6. Remove a sliced portion S7. Form the sliced portion into a shaped tool component

34

16

P

18

R

32

34

30

16

Q

32

P

18

R

34

16

18

34

16

44

16

18

44

16 a                              b a                    b a                    b a          b          c

METHOD OF MAKING A SHAPED TOOL COMPONENT

CROSS-REFERENCE TO RELATED APPLICATIONS

This application is a § 371 national stage of International Application No. PCT/EP2022/058970, filed Apr. 5, 2022, which claims priority to Great Britain Application No. 2105770.8, filed Apr. 22, 2021.

FIELD OF THE INVENTION

The present disclosure relates to shaped superhard tool components for cutting wear resistant products, particularly to a method of making said shaped tool components and more particularly to those comprising polycrystalline diamond.

BACKGROUND

Hard or abrasive workpiece materials, such as metal alloys, ceramics, cermets, certain composite materials and stone may need to be machined using tools having hard or superhard cutting tips. Cemented tungsten carbide is the most widely used tool material for machining hard workpiece materials, and is both hard and tough. Polycrystalline diamond (PCD) and polycrystalline cubic boron nitride (PCBN) are superhard materials, which may be used for machining certain metal alloys widely used in, for example, the automotive industry. Superhard materials are extremely hard and have Vickers hardness of at least about 25 GPa. However, superhard materials are typically less strong and tough than cemented carbide materials and consequently, they may be more prone to fracture and chipping than hard-metals. Superhard tool inserts may comprise a superhard structure bonded to a support substrate ('backed'), which is most typically formed of cemented tungsten carbide. Tool inserts with complex geometries are not common due to the cost associated with producing and subsequently shaping the PCD.

There is a need to develop a more economical way of making shaped tool inserts from PCD.

SUMMARY OF THE INVENTION

According to the invention, there is provided a method of making a shaped tool component comprising polycrystalline diamond (PCD), comprising the steps:

a. Adding a diamond feed stock to a refractory cup;
b. Adding a pre-shaped cemented carbide body to the refractory cup adjacent the diamond feed stock;
c. Compacting the diamond feed stock and cemented carbide body to form a green body;
d. Sintering the green body at a temperature between 1400° C. to 2100° C. and at a pressure of at least 7 GPa, for at least 30 seconds to form a sintered PCD precursor body that comprises a PCD table sinter-joined to the cemented carbide substrate at an interface;
e. Slicing longitudinally into the sintered PCD precursor body to produce one or more sliced portions of the sintered PCD precursor body, each sliced portion being a tool blank;
f. Removing one of said tool blanks from the remainder of the sintered PCD precursor body; and
g. Shaping said tool blank into a shaped tool component, in which the thickness of the PCD table in the shaped tool component varies at two or more locations spaced apart laterally on the cemented carbide substrate.

Optional and/or preferable features of the invention are provided in the dependent claims.

BRIEF DESCRIPTION OF THE DRAWINGS

The invention will now be more particularly described, by way of example only, with reference to the accompanying drawings, in which.

The same references refer to the same respective features in all drawings.

DETAILED DESCRIPTION

Figure 1:
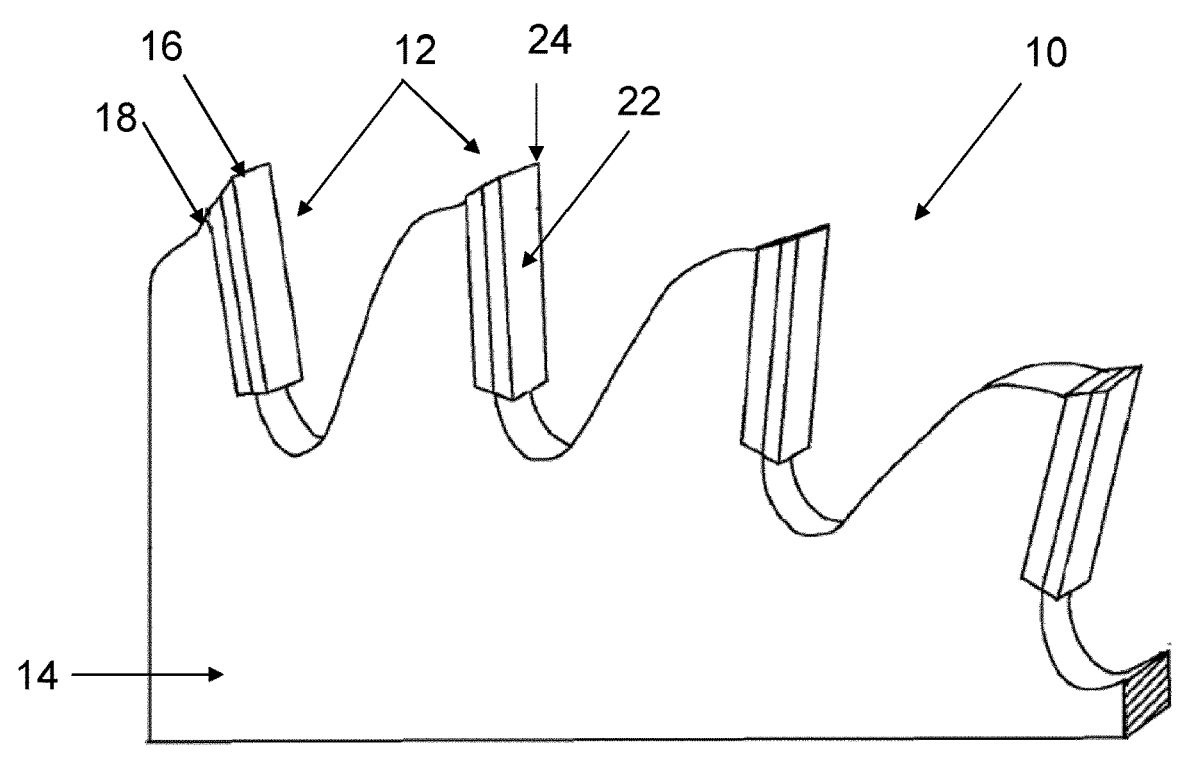
FIG. 1 is a schematic perspective view of part of a circular saw for cutting wood.
Figure 2:
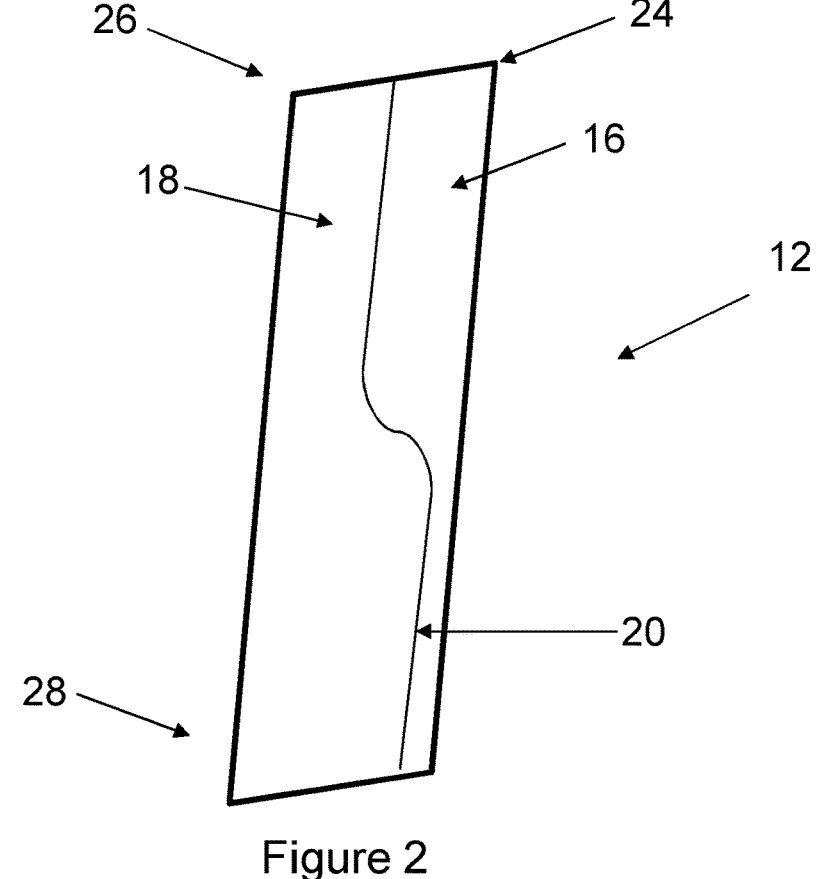
FIG. 2 is a schematic side view of a tool insert for use in the circular saw of FIG. 1.

With reference to FIGS. 1 and 2, a circular saw 10 for cutting wear resistant wood products, such as laminate flooring, comprises a plurality of tool inserts 12 brazed onto the periphery of a blade base 14. Each tool insert 12 is derived from a shaped tool component, as explained in more detail below. Each tool insert 12 comprises a PCD table 16 sinter-joined to a cemented carbide substrate 18 at an interface 20. The tool inserts 12 are arranged with a rake face 22 of the PCD table 16 facing the direction of rotation of the saw 10 in use, with cutter edges 24 disposed at radially outermost positions capable of cutting a workpiece (not shown) when the saw 10 is rotated in use.

In longitudinal cross-section, the interface 20 comprises a series of interconnected arcuate and linear interface segments. The proportion of PCD table 16 to cemented carbide substrate 18 within the tool insert 12 varies from a first end 26 to a second end 28, the second end 28 being spaced apart from the first end 26. The first end is located at the cutter edge 24. Proximate the cutter edge 24, the proportion of PCD table 16 to carbide 18 substrate is highest, and it gradually decreases towards the second end 28. This arrangement enables distribution of PCD 16 only in the regions in which it is actually required during use, near the cutting edge, thereby lowering the production cost of the tool insert.

Figure 3:
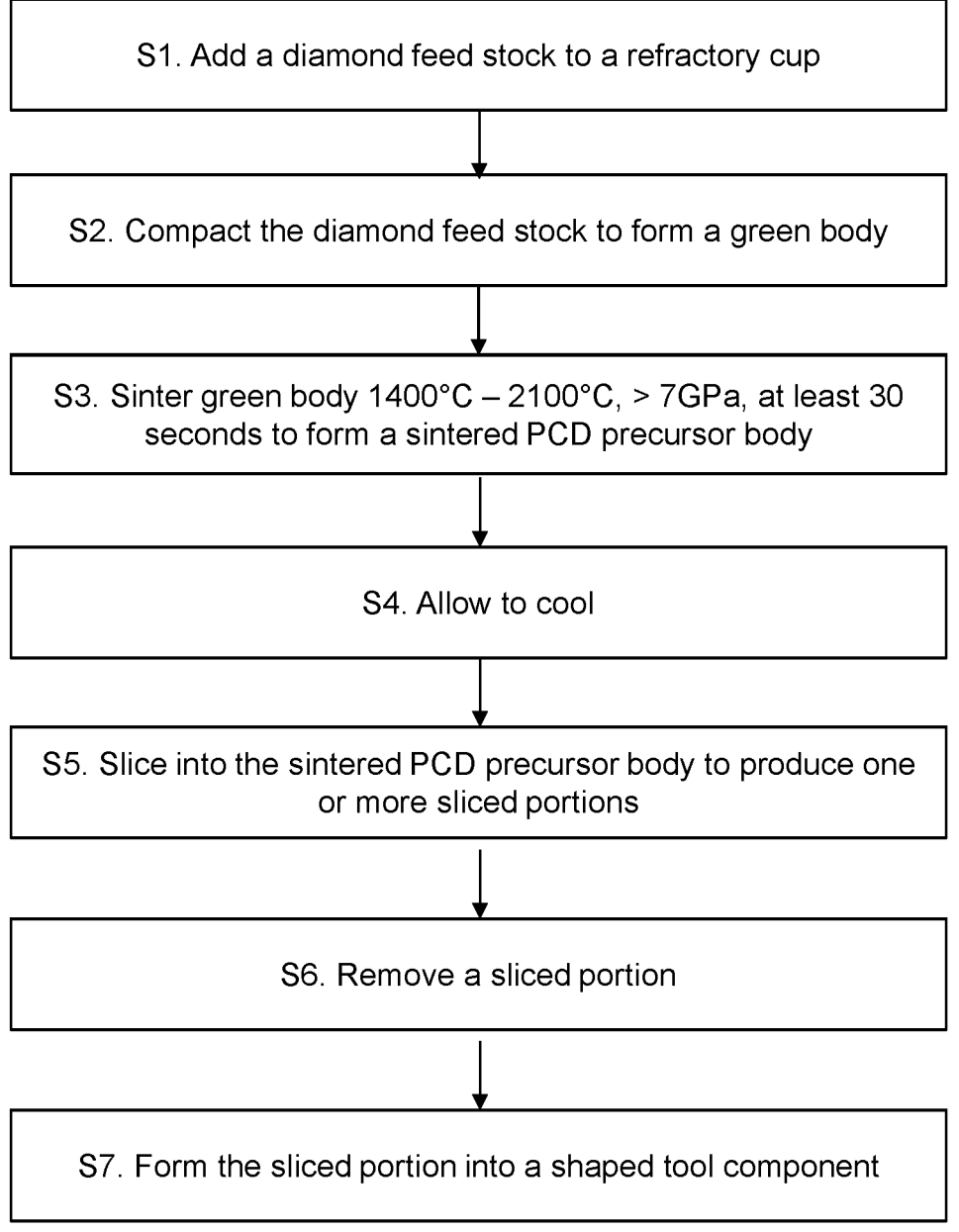
FIG. 3 is a schematic flow diagram showing a method of making the tool insert.
Figure 4:
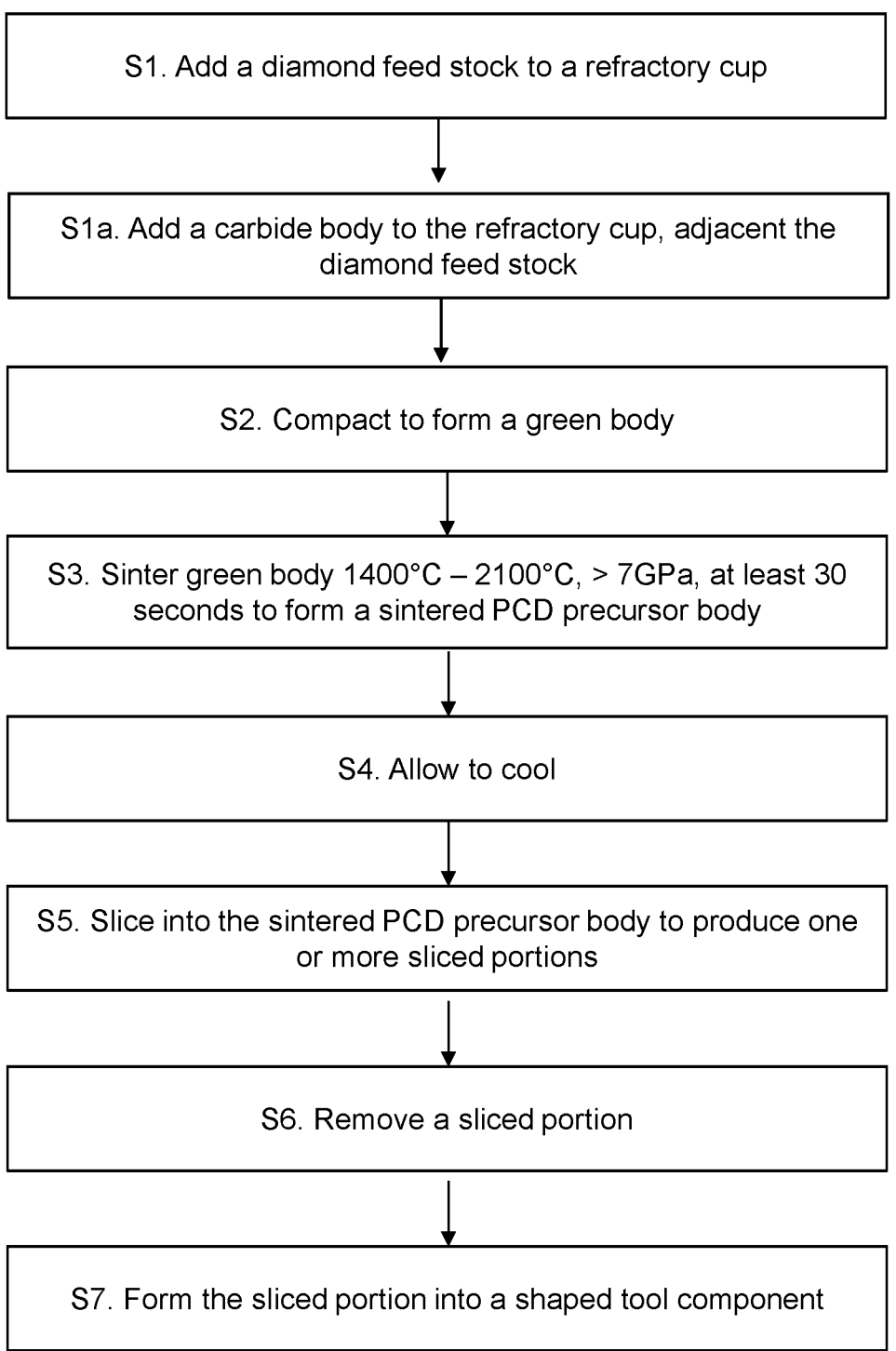
FIG. 4 is a schematic flow diagram showing an alternative method of making the tool insert.
Figure 5:
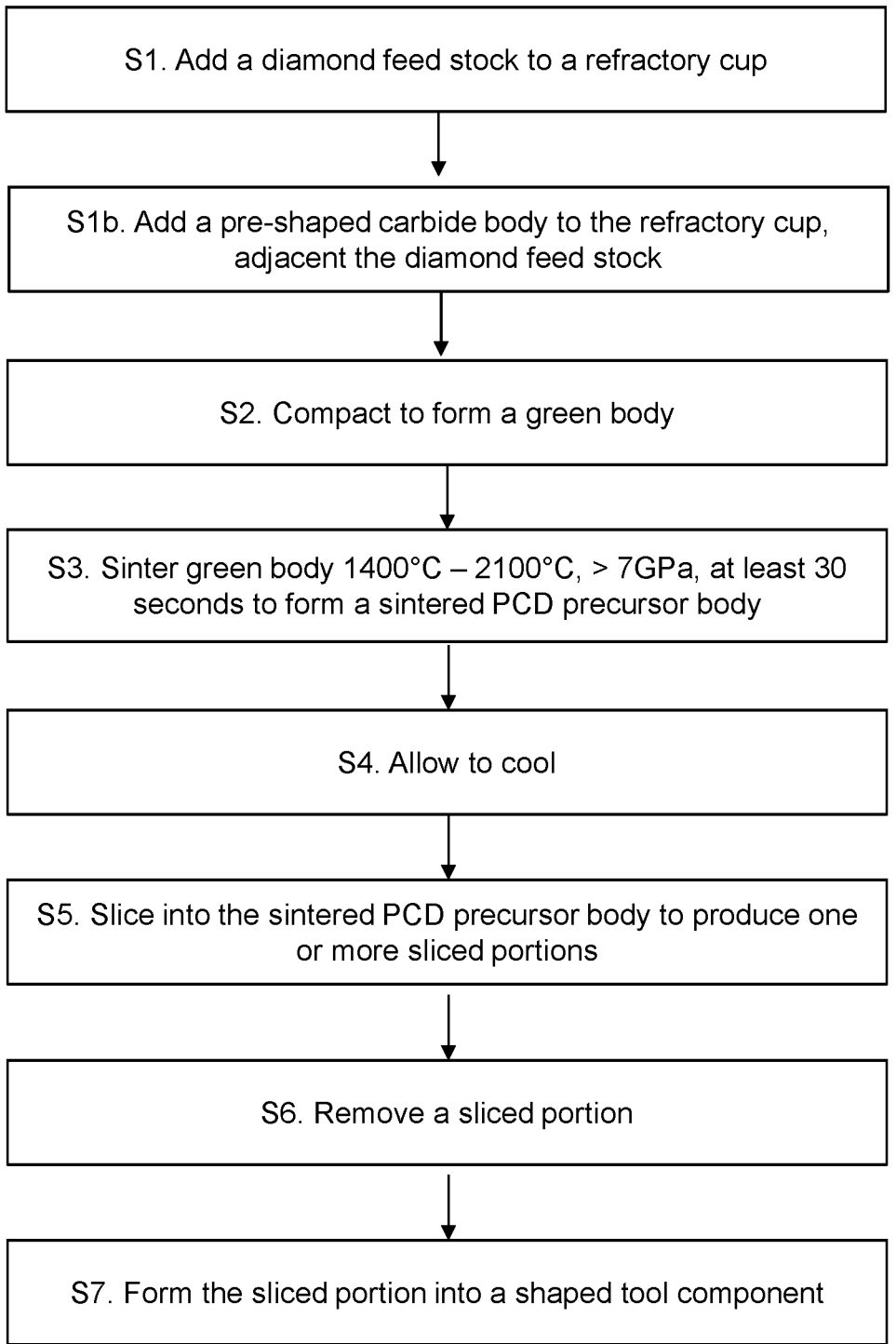
FIG. 5 is a schematic flow diagram showing a yet further alternative method of making the tool insert.
Figure 6:
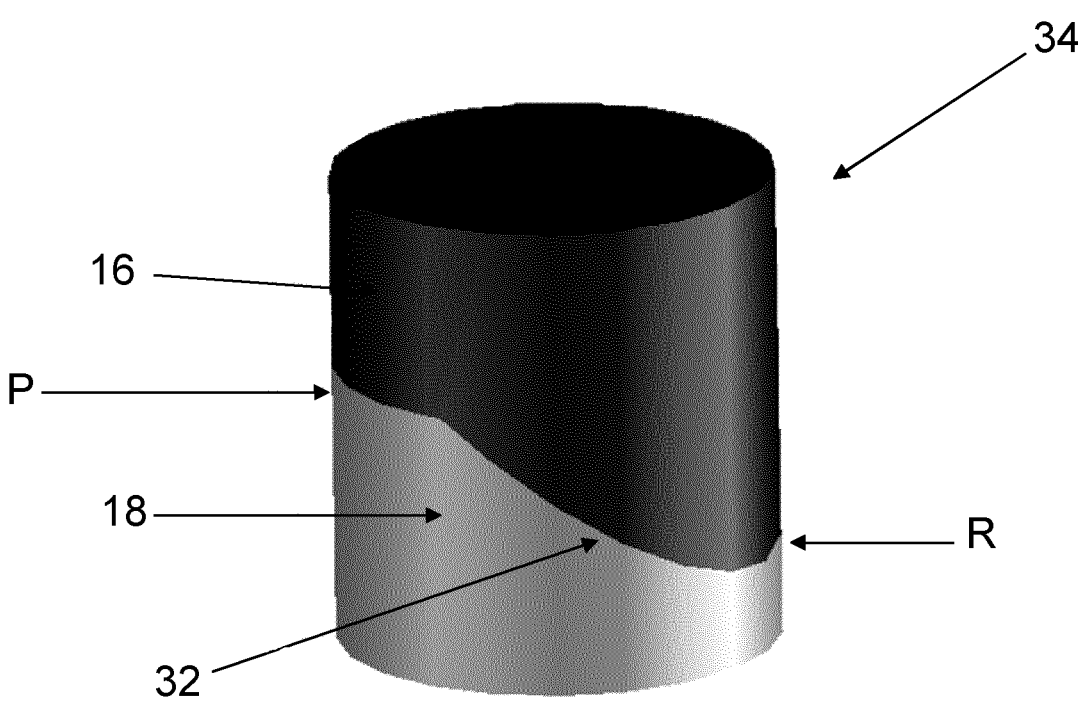
FIG. 6 is a schematic perspective view of a first sintered PCD precursor body.

Turning now to FIGS. 3, 4 and 5, production of the tool insert shall now be described, in which the following numbering corresponds to that used in the aforementioned Figures.

S1. A diamond feed stock is added to a cup made from refractory material such as niobium, tantalum or molybdenum. Typically, the cup is cylindrical.

S1*a*. Optionally, a cemented carbide body is also added to the cup, adjacent to the diamond feed stock.

S1*b*. Optionally, the cemented carbide body is shaped prior to being added to the cup.

S2. The diamond feed stock and cemented carbide body, if present, are then compacted to form a green body. If desired, the compaction stage may take place before the diamond feedstock and cemented carbide body, if present, are placed into the cup.

The green body is outgassed to minimise the distortion of the final shape. Again, this may take place before the green body is placed into the can.

After outgassing, the green body and cup are then assembled with additional cupping material into a 'pre-composite body'.

S3. The pre-composite body is then sintered in a High Pressure High Temperature (HPHT) capsule within a HPHT belt press or a HPHT cubic press, at a temperature of between 1400 and 1800° C. for a period of at least 30 seconds. This forms a sintered PCD precursor body.

S4. The sintered PCD precursor body is then removed from the HPHT capsule as soon as is reasonably possible and allowed to cool to room temperature.

S5. The sintered PCD precursor body is then sliced longitudinally to produce one or more sliced portions called 'tool blanks'.

Depending on the end application, the thickness of each tool blank may vary. For example, the tool blank may be a relatively thick, rectangular cuboid in shape for end use in a circular saw tool insert. Alternatively, the tool blanks may be relatively thin and plate-like, for example, for end use in a turning or milling tool element.

S6. The tool blank is removed from the remainder of the sintered PCD precursor body.

S7. The tool blank is shaped into its final form, a shaped tool component, using electrical discharge machining (EDM) or laser cutting.

EXAMPLE

Referring to FIGS. 6 to 11, a second shaped tool component was produced generally according to the above methodology, including optional steps 1*a*) and 1*b*).

The cemented carbide body 18 comprised cemented tungsten carbide, and it had an initial diameter of around 21 mm, with a maximum height of 12 mm.

Figure 7:
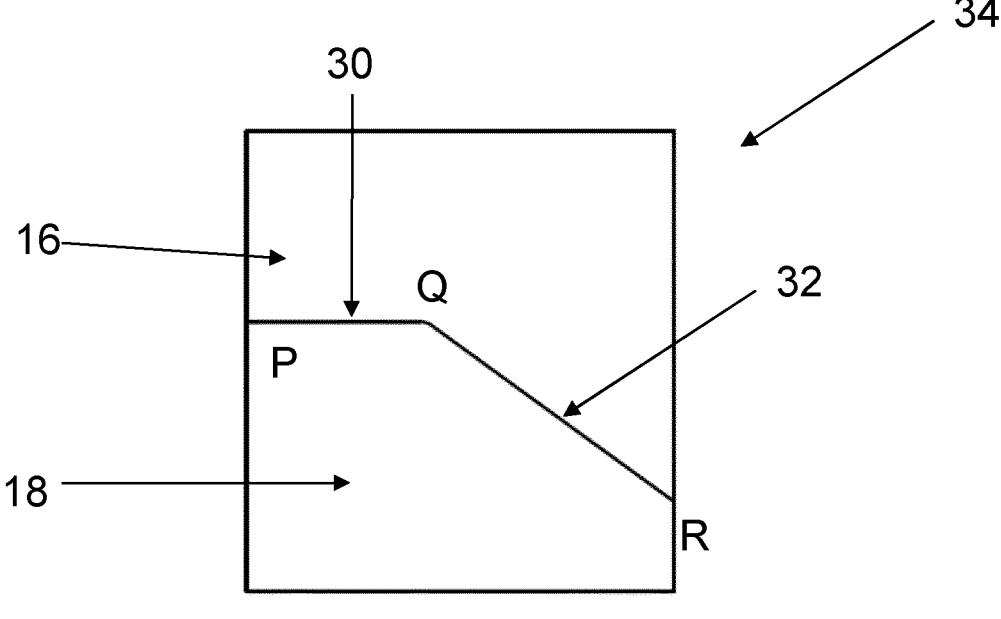
FIG. 7 is a side view of the sintered PCD precursor body of FIG. 6, showing in particular a PCD table sinter-joined to a carbide substrate at an interface.
Figure 8:
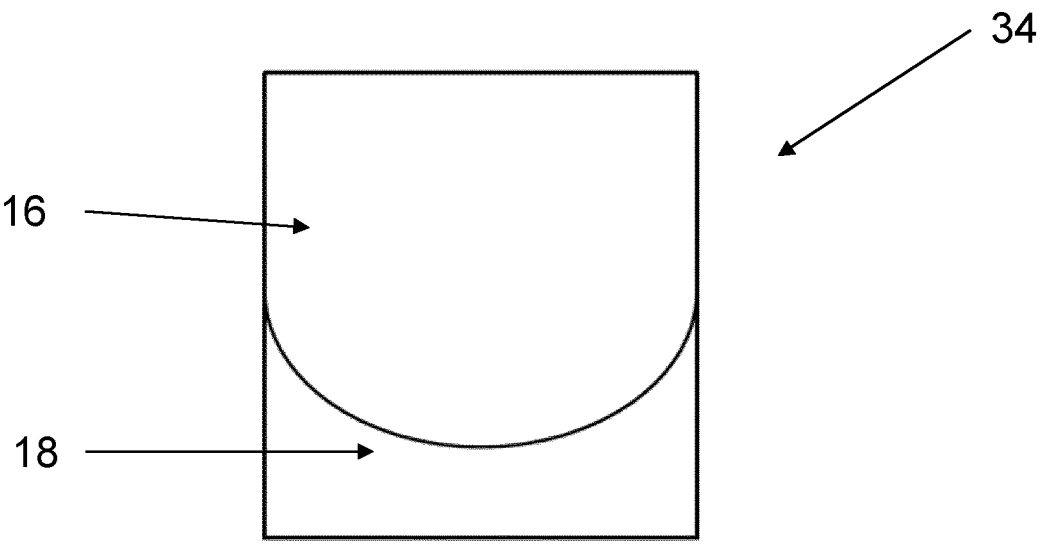
FIG. 8 is a front view of the sintered PCD precursor body of FIG. 6.
Figure 9:
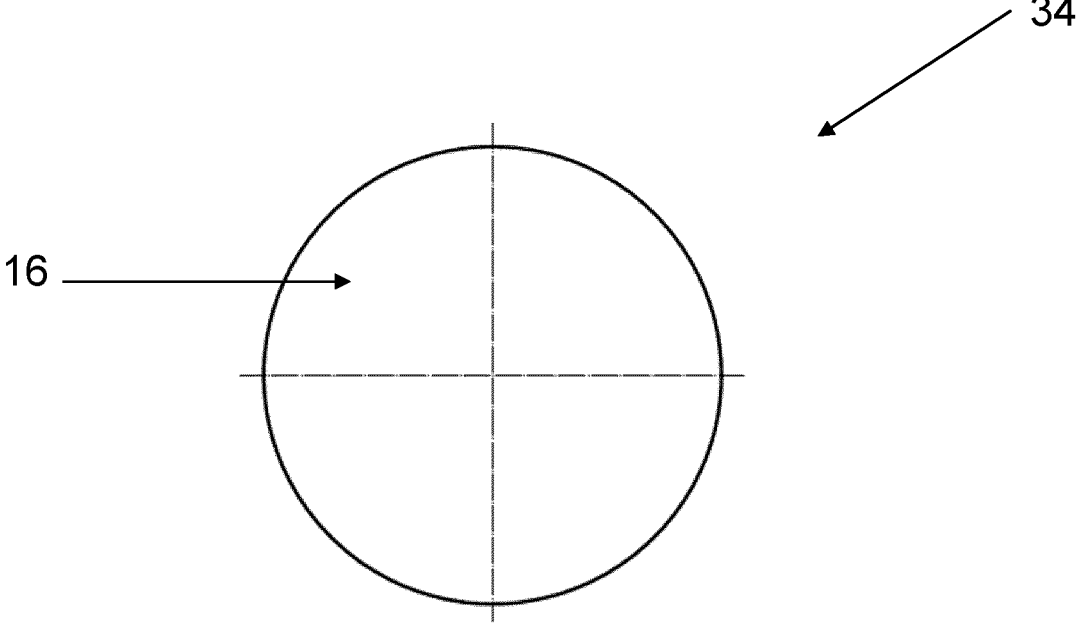
FIG. 9 is a plan view of the sintered PCD precursor body of FIG. 6.
Figure 10:
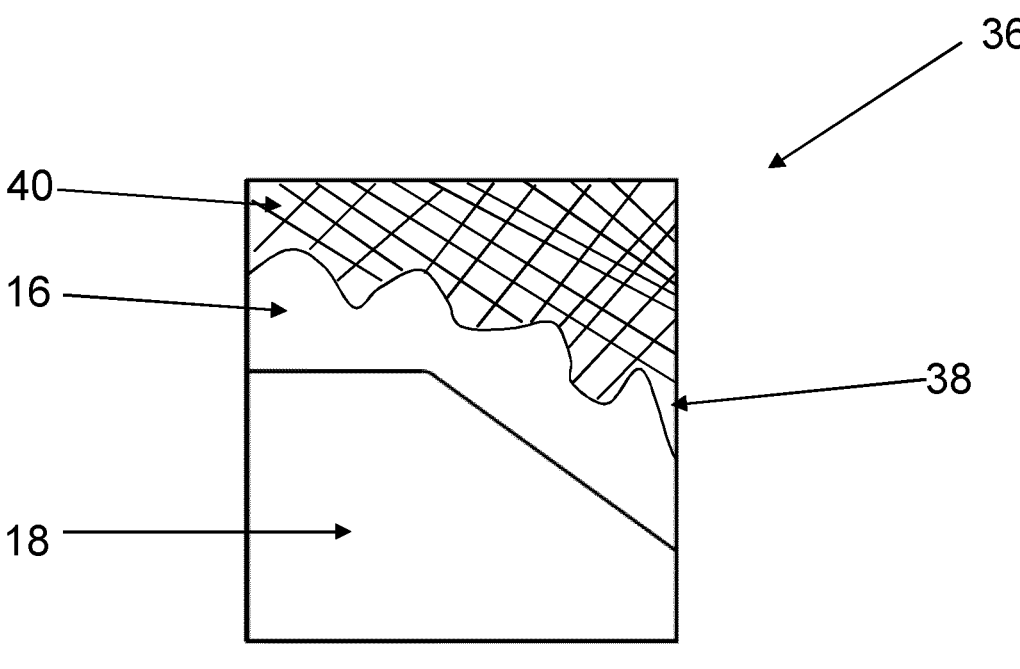
FIG. 10 is a schematic side view of a tool blank sliced from the sintered PCD precursor body of FIG. 6, with a superimposed tool profile, showing in particular the excess material of the PCD table intended for removal.
Figure 11:
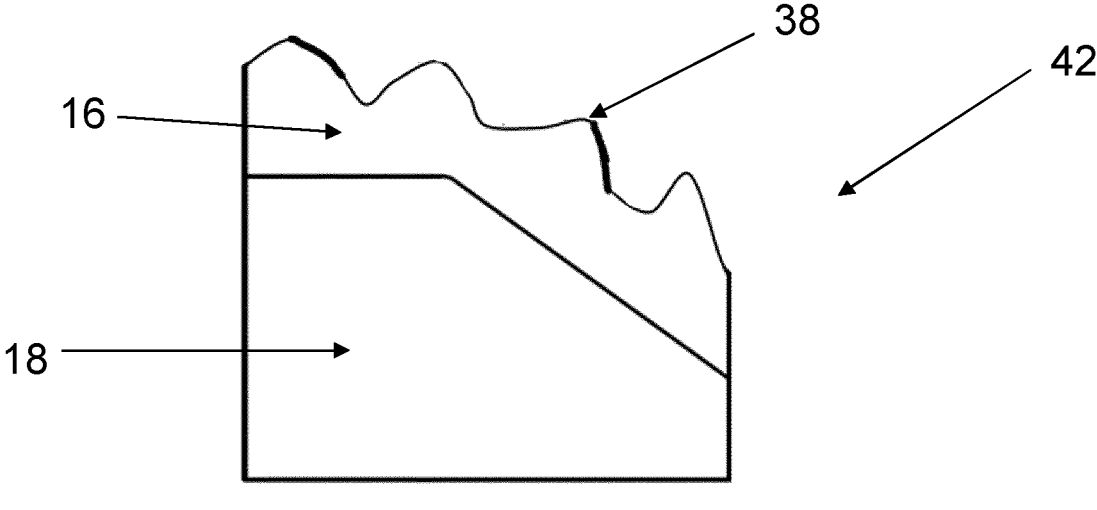
FIG. 11 is a schematic side view of the shaped tool component of FIG. 10 after the excess material has been removed.
Figure 12:
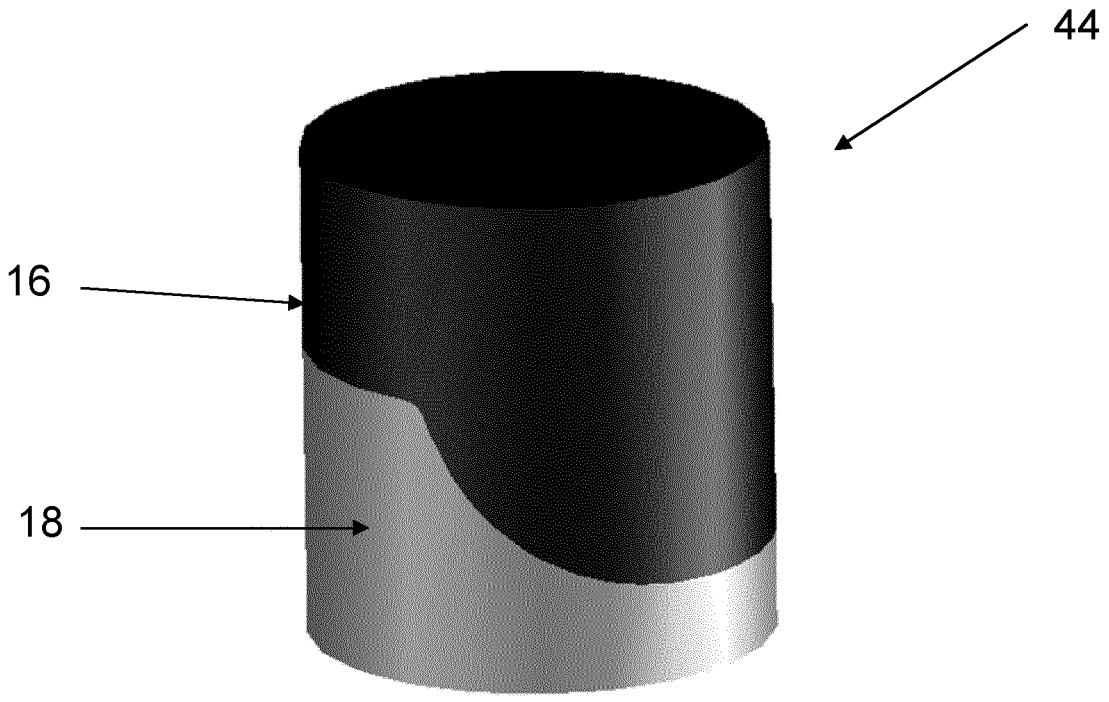
FIG. 12 is a schematic perspective view of a second sintered PCD precursor body.
Figure 13:
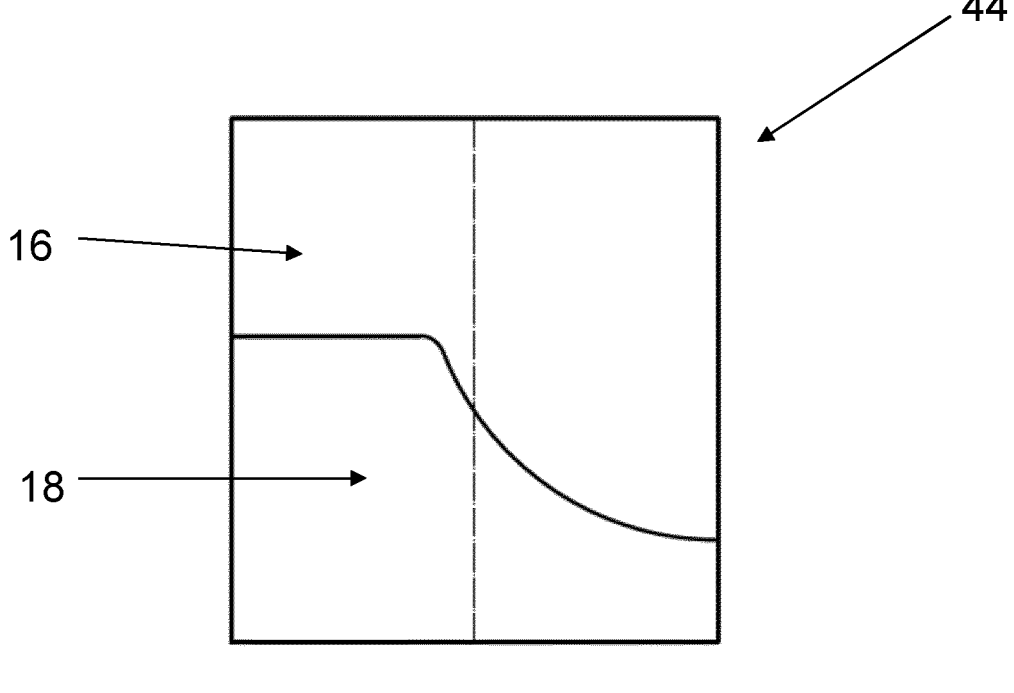
FIG. 13 is a side view of the sintered PCD precursor body of FIG. 12.
Figure 14:
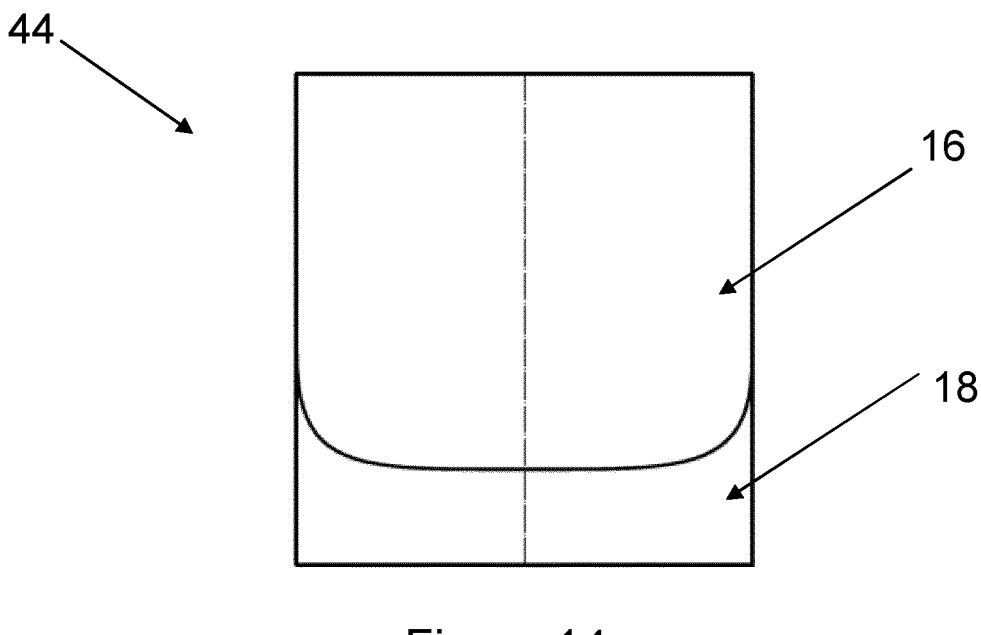
FIG. 14 is a front view of the sintered PCD precursor body of FIG. 12.
Figure 15:
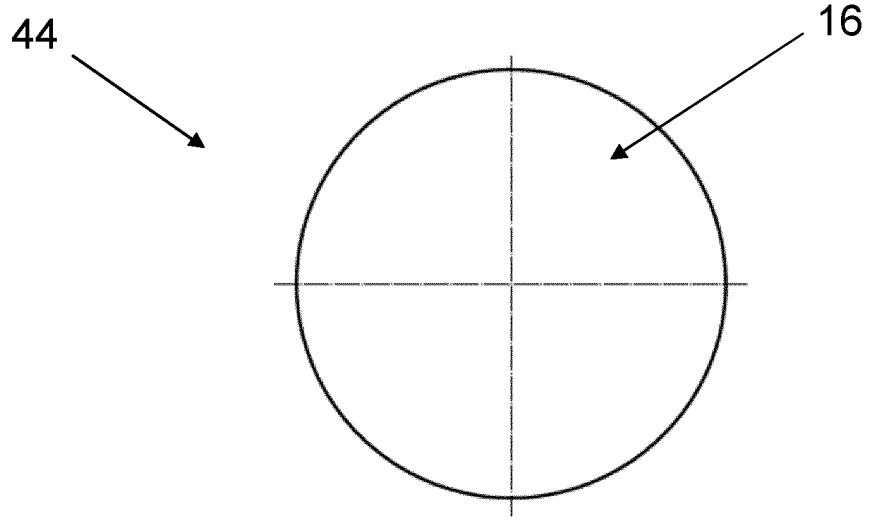
FIG. 15 is a plan view of the sintered PCD precursor body of FIG. 12.

Prior to insertion into the refractory cup, the cemented carbide body 18 was shaped by EDM to include a generally horizontal planar first portion 30, extending into a downwardly sloping planar second portion 32, as indicated in FIG. 7. Planar first portion 30 extends horizontally between point P, located on the periphery and point Q, wherein point Q is radially inward of point P. Planar second portion 32 slopes axially downwardly between point Q and point R, where point R is located on the periphery, circumferentially spaced apart from point P. In this example, the maximum height of the cemented carbide body taken at point P, was the starting height 12 mm, measured from a base of the cemented carbide body 18. The minimum height of the carbide body taken at point R, was 4 mm, again measured from the base.

A diamond feed stock was used with an average particle size of 22 μm and cobalt added in.

After HPHT sintering, sintered PCD precursor body, indicated generally at 34, was removed from the HPHT capsule and allowed to cool to room temperature. The outer cupping material was ground away to reveal the sintered PCD precursor body 34 within.

The sintered PCD precursor body 34 was sliced longitudinally using EDM to segregate a portion from the remainder. The sliced portion was then removed to provide a tool blank 36. The tool blank 36 had a generally rectangular planar shape, with a thickness of no more than 8 mm.

Again using EDM, a tool profile 38 was machined into the PCD table 16 of the tool blank 36 and the unwanted PCD 40 removed to produce a shaped tool component 42. An example of a shaped tool component 42 with an overly simplistic tool profile 36 is given in FIGS. 10 and 11, which is not intended to be used in practice. Any shape, size or direction of tool profile 38 may be used. Importantly, the tool profile 38 follows the overall contour of the cemented carbide substrate 18. As the height of the substrate 18 changes, so too does the height of the PCD table 16 above it, as measured from the base of the cemented carbide substrate 18. Given the configuration of the cemented carbide substrate 18, a much greater depth of PCD table 16 is achievable but without having to impose that increased depth where it is unnecessary.

Example

Referring to FIGS. 12 to 17, a third shaped tool component was produced generally according to the above methodology, including optional steps 1*a*) and 1*b*). The sintered PCD precursor body, from which the shaped tool component was derived, is indicated generally at 44. The third shaped tool component is similar to the second variant, except for the contouring of the cemented carbide body 18 prior to its insertion into the refractory cup.

Figure 16:
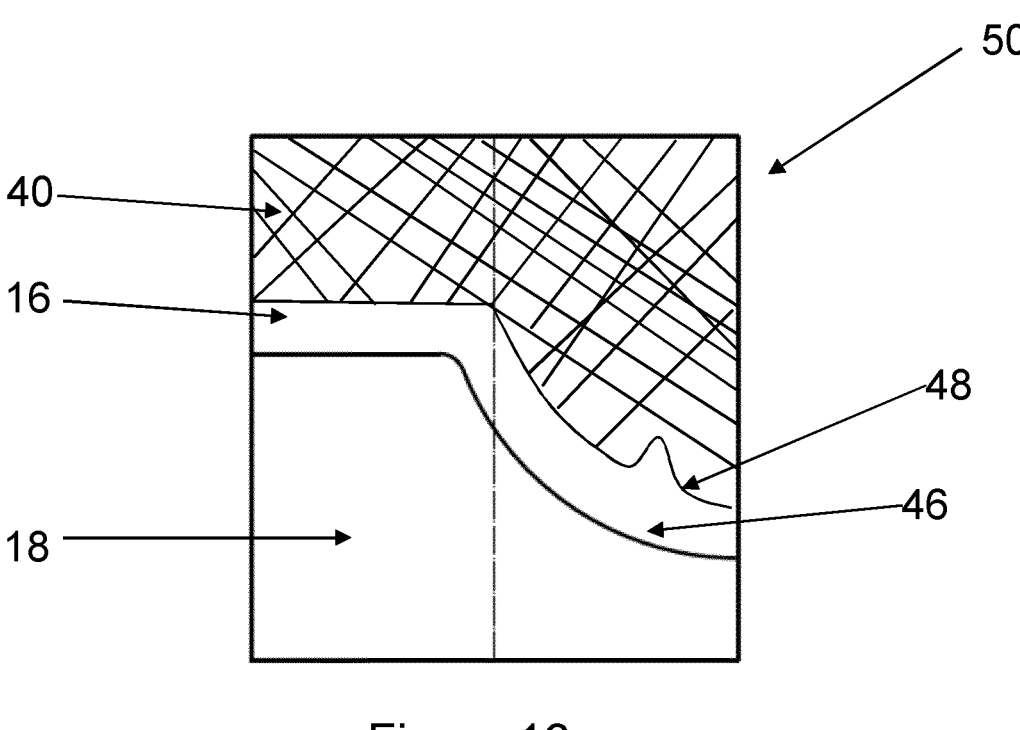
FIG. 16 is a schematic side view of a tool blank sliced from the sintered PCD precursor body of FIG. 12, with a different superimposed tool profile, showing in particular the excess material of the PCD table intended for removal.
Figure 17:
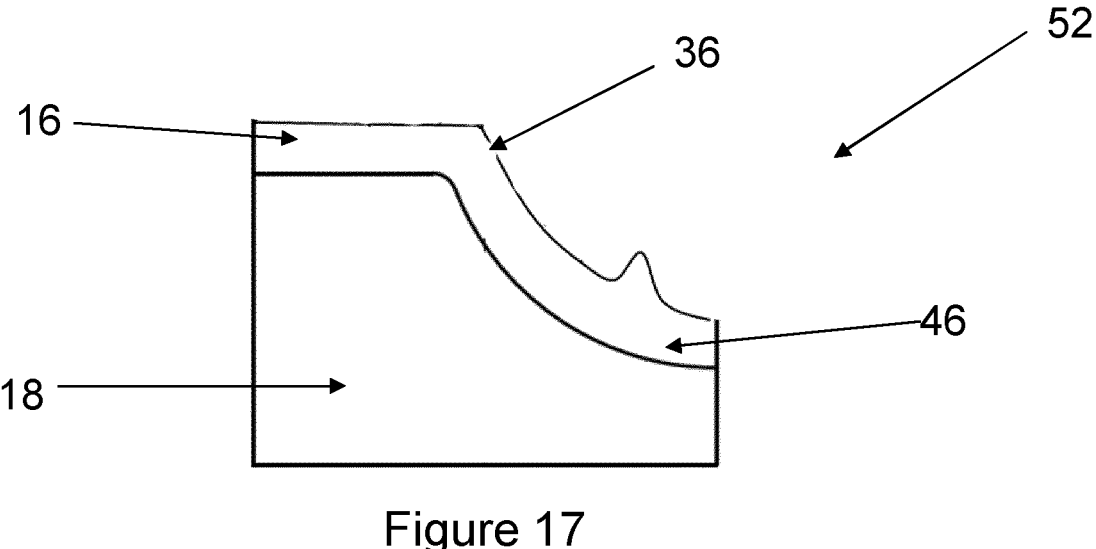
FIG. 17 is a schematic side view of the shaped tool component of FIG. 16 after the excess material has been removed.
Figure 18:
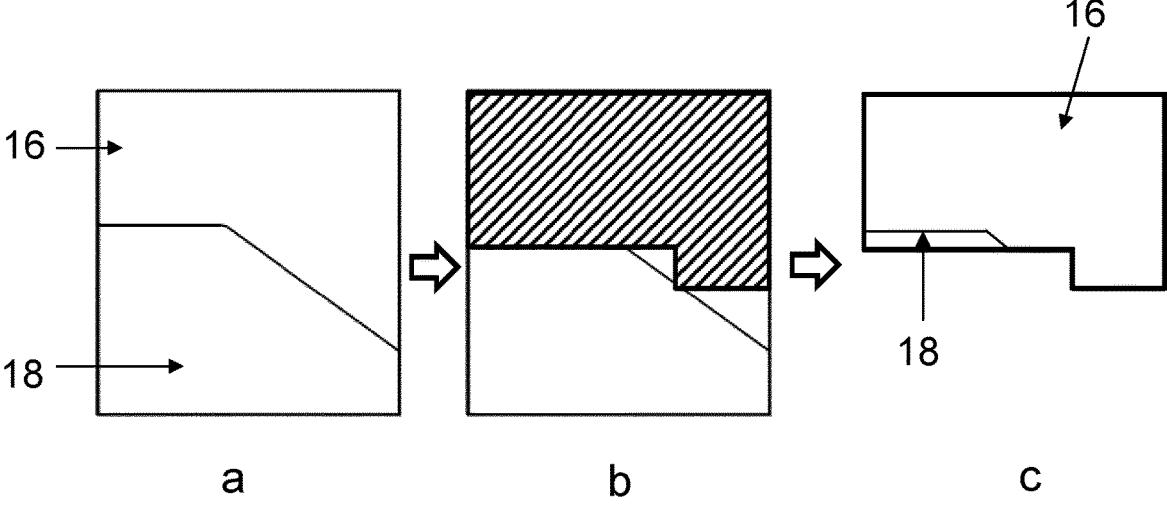
FIGS. 18a to 18c are a set of three schematics illustrating the shaping of an L-shaped partially backed component out of a tool blank.
Figure 19:
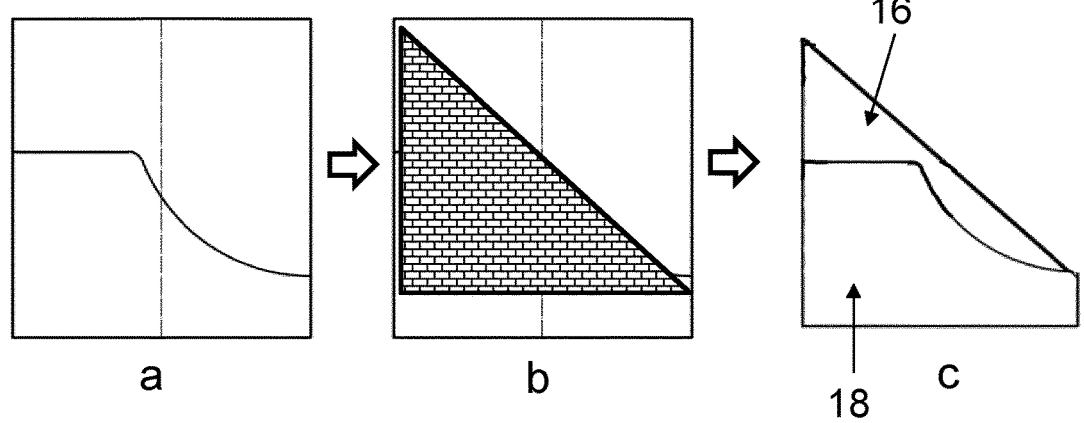
FIGS. 19a to 19c are a set of three schematics illustrating the shaping of a triangular shaped backed component out of a tool blank.

As best seen in FIGS. 16 and 17, the underlying cemented carbide substrate 18 includes generally horizontal planar first portion 30 and downwardly sloping, arcuate second portion 46 instead of sloping planar second portion 32. Again, the contour of the PCD table 16 generally follows that of the underlying shaped substrate 18.

With this method of making a shaped tool component, only the required thickness of PCD table need be provided and no more. Using conventional methods, much thicker PCD tables would otherwise be required in order to achieve the required depth on a shaped tool component, consequently generating much more unusable PCD table.

Any tool profile may be provided in the PCD table. For example, in lateral cross-section, a tool profile may comprise segments being any of the following: arcuate, linear, rectilinear, sawtooth, sinusoidal. Multiple segment shapes such as these may be used or any combination thereof.

In this third variant, a second tool profile 48, different to the first mentioned tool profile 38, was machined into the PCD table 16 of the resulting tool blank 50. The unwanted PCD 40 material from the PCD table 16 was removed to produce a further shaped tool component 52.

The profile of the PCD table 16 need not be the same as the profile of the underlying cemented carbide substrate 18, as demonstrated in the second and third variants. However, the profile of the PCD table 16 may be the same as the profile of the underlying cemented carbide substrate 18, as demonstrated with the first variant.

FIGS. 18*a* to 18*c* and FIGS. 19*a* to 19*c* illustrate how backed (i.e. with a carbide substrate) and partially backed tool components may be partially formed out of a tool blank. Using the method of slicing 2D tool blanks from a 3D sintered PCD precursor body, irregularly shaped tool components may be made with minimal wastage.

In all variants, shaping need not be restricted to creating a profile on the PCD table. Shaping may extend to creating a profile on the substrate too. Most importantly, shaping also extends to machining an outline of a shaped tool component entirely contained with a footprint of the tool blank. For example, an entire letter 'A' may be shaped out of the tool blank. Any desired form of shaped tool component may be shaped out of the tool blank, whether the parent sintered PCD precursor body comprised a cemented carbide substrate or not.

Although reference has been made to several examples that included a cemented carbide body/substrate, the cemented carbide body may be omitted from the method of making a shaped tool component. Indeed, shaping may be limited to shaping a tool blank consisting of sintered PCD, sliced from the sintered PCD precursor body. In this case, the shaped tool component may take any form.

Related to this aspect, during their development work, the inventors investigated increasingly deeper PCD tables. Two samples, each with a planar cemented carbide substrate, were produced. In Sample A, the green body had been cut to a depth of 10 mm. In Sample B, the green body had been cut to a depth of 20 mm. Both green bodies were then sintered.

Figure 20:
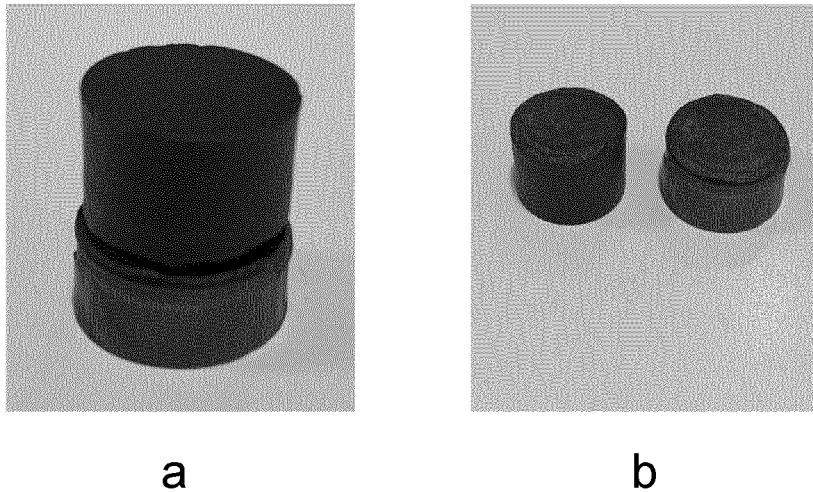
FIG. 20a shows Sample A from the 10 mm green body trial after removal from the HPHT press, with the PCD table delaminated from the substrate.
FIG. 20b shows the delaminated PCD table and substrate having been separated.

Although Sample A successfully sintered, the PCD layer delaminated from the substrate. FIG. 20*a* shows Sample A ex-press, and FIG. 20*b* shows the same PCD table and substrate separated. The delamination may have been due to high stresses relating to PCD volume collapse or simply that the synthesis conditions were slightly too hot.

Figure 21:
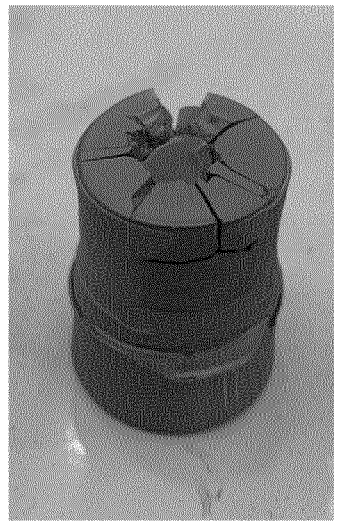
FIG. 21 shows Sample B from the 20 mm green body trial after removal from the HPHT press.

In Sample B, closer inspection suggests that there may have been two waves of cobalt infiltration: one sweeping up uniformly from the substrate, and the other sweeping up the perimeter and around the top surface—see FIG. 21. This left a sintered bottom half of the PCD layer and a cracked top half, and a soft unsintered core.

In order to address the issue of a soft unsintered core brought about by trying to achieve an ultra-thick (>10 mm) PCD table, a number of variables were investigated. This included the synthesis conditions (pressure, temperature and time), use of out-gassing, pre-compaction loads and temperatures, varying depths of substrate, different HPHT press capsule arrangements and use of a cobalt interlayer in the green body between the diamond feed stock and the carbide substrate.

In a later phase of work, four additional samples were prepared—see Table 1.

TABLE 1

| Sample | Details |
|--------|---------|
| 1 | Diamond feed with 10% Co admix and no out-gassing |
| 2 | Diamond feed with Co foil at interface and no out-gassing |
| 3 | Diamond feed with 10% Co admix and out-gassing |
| 4 | Diamond feed with Co Foil at interface and out-gassing |

Figure 22:
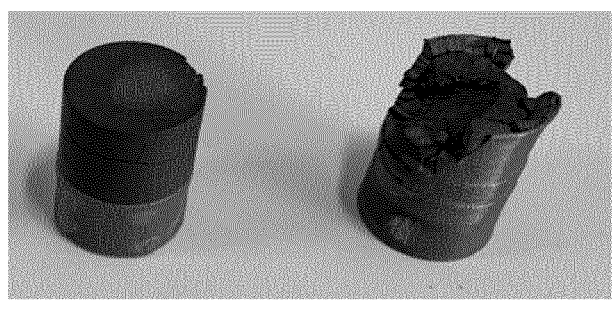
FIG. 22a shows Sample 1 after sintering with a standard sintering profile.
FIG. 22b shows Sample 2 with a prolonged sintering profile.

Sample 1, made using sintering profile no. 1, showed no improvement from the previous phase of work and suffered a soft core. For Sample 2, it was decided to use an alternative sintering profile, which included a prolonged sintering time. Sample 2 was mostly sintered throughout. FIG. 22*a* shows Sample 1 and FIG. 22*b* shows Sample 2 both after sintering.

Figure 23:
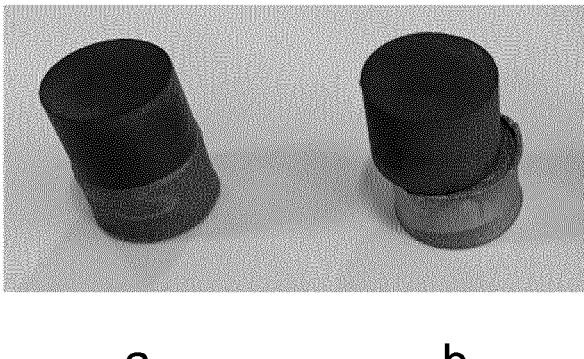
FIG. 23*a* shows Sample 3 and FIG. 23*b* shows Sample 4 both after sintering with a prolonged sintering profile.

After out-gassing, Samples 3 and 4 were sintered using the second, longer, sintering profile. Sample 3 had a fully sintered ultra-thick PCD table without any visible defects. Sample 4 also fully sintered but the PCD layer delaminated from the substrate, thought due to excess Co foil at the interface. FIG. 23*a* shows Sample 3 and FIG. 23*b* shows Sample 4 both after sintering.

Figure 24:
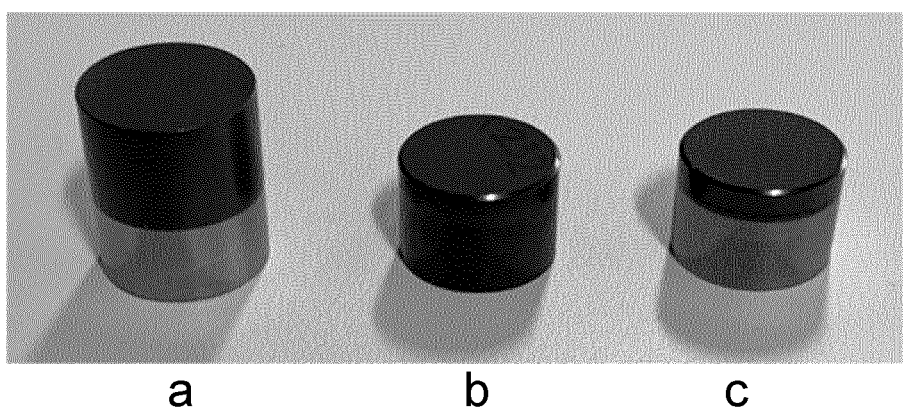
FIG. 24*a* shows Sample 3 with the PCD table sinter-joined to the substrate and after subsequent processing.
FIG. 24*b* shows Sample 4 after delamination and after subsequent processing.
FIG. 24*c* shows a standard Oil and Gas cutter for comparative purposes.

For subsequent characterisation tests, Samples 3 and 4 were cleaned of cup material. FIG. 24*a* shows Sample 3. FIG. 24*b* shows Sample 4 after delamination, and after it had been processed to match a standard Oil and Gas cutter (FIG. 24*c*) in overall shape and size. The cutter in FIG. 24*c* has a diameter of 16 mm and a PCD table height of 3.5 mm. In contrast, Sample 4 in FIG. 24*b* has a diameter of 16 mm and a PCD table height of 12 mm.

Hot pre-compaction was found to be essential for successfully sintering the samples with the ultra-thick PCD body. These specific samples were sintered at 5.5 GPa for 20 minutes and at a temperature of around 1400° C. However, a broader operating window is feasible. Pre-compaction occurs at a temperature in the range of 1300° C. and 1500° C., at a pressure in the range of 5 to 8 GPa and a duration in the range of 15 to 25 minutes. The compaction stage is characterised by the absence or very low quantities of catalyst/binder material, such as cobalt. The quantity is insufficient for complete sintering. This is primarily added afterwards and may be included in any one or more of the following ways: use of cobalt foil, use of a layer of cobalt powder e.g. at the interface between the diamond feed and the substrate and use of a cemented carbide substrate containing cobalt. Additionally, the pre-compaction step occurs in a first HPHT press run, and sintering in a second, different HPHT press run requiring a separate capsule assembly.

The inventors had found a surprisingly new way of obtaining an ultra-thick PCD body. It may be backed (i.e. with a substrate) based on the outcome of Sample 3, or unbacked (i.e. freestanding) based on the outcome of Sample 4. By comparison, hitherto, Oil and Gas cutters with a PCD table only up to 5 to 6 mm deep had been obtained. The implication for cutters used in Oil and Gas drilling is significant as the PCD table, delaminated from the substrate as in Sample 4, may be processed into a standalone cutter.

Figure 25:
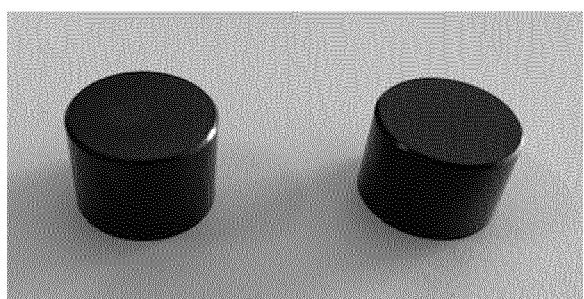
FIG. 25 shows two PCD bodies obtained using intentional delamination that have been subsequently processed into an Oil and Gas cutter configuration.

To investigate further, a diamond feed stock was used containing particles with an average particle size of 17 μm. Further samples were produced and processed into cutters, both without substrates—see FIG. 25. The samples were then sent for chemical leaching, a process for removing the cobalt from interstitial regions in the PCD body. Removal of the cobalt from the diamond lattice structure renders the PCD more heat resistant and therefore more suitable for Oil and Gas drilling operations.

Figure 26:
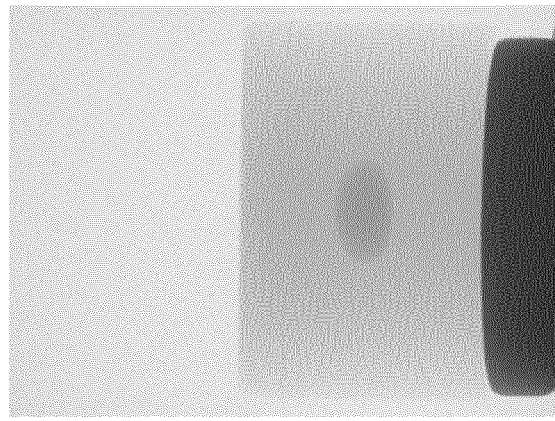
FIG. 26 shows one of the cutters of FIG. 25 after chemical leaching.

The removal of the tungsten carbide substrate facilitated a new, quicker method of leaching the cutters. This method did not require any complicated fixturing to protect the substrate and the cutters were able to be placed into a sealed container of hydrochloric acid (HCl) and heated to a much higher temperature than standard cutters. As can be seen in FIG. 26, the 16 mm diameter cutters were leached from all sides, leaving only a small amount of cobalt in the centre, which is a superb result.

The leached cutters were then taken for characterisation tests. Cutters performed exceptionally well in subsequent performance tests.

While this invention has been particularly shown and described with reference to examples, it will be understood by those skilled in the art that various changes in form and detail may be made without departing from the scope of the invention as defined by the appended claims.

Definitions

Certain standard terms and concepts as used herein are briefly explained below.

PCD comprises a mass of inter-grown diamond grains forming a skeletal mass which defines interstices between the diamond grains. PCD material typically comprises at least 80 vol. % of diamond and is obtained by HPHT sintering in the presence of a sintering aid, also referred to as catalyst material for diamond. Catalyst materials for diamond are understood to be materials that are capable of promoting direct inter-growth of diamond grains at a pressure and temperature condition at which diamond is thermodynamically more stable than graphite.

Catalyst materials for diamond often include a Group VIII element and common examples are cobalt, iron, nickel and certain alloys including alloys of any of these elements. PCD may be formed on a cobalt-cemented tungsten carbide substrate, which may provide a source of cobalt catalyst material for the PCD. During sintering of the body of PCD material, a constituent of the cemented-carbide substrate, such as cobalt in the case of a cobalt-cemented tungsten carbide substrate, liquefies and sweeps from a region adjacent the volume of diamond particles into interstitial regions between the diamond particles. The cobalt acts as a catalyst to facilitate the formation of bonded diamond grains. Optionally, a metal-solvent catalyst may be mixed with diamond particles prior to subjecting the diamond particles and substrate to the HPHT process. The interstices within PCD material may at least partly be filled with the catalyst material. The intergrown diamond structure therefore comprises original diamond grains as well as a newly precipitated or re-grown diamond phase, which bridges the original grains. In the final sintered structure, residual catalyst/solvent material generally remains present within at least some of the interstices that exist between the sintered diamond grains.

A problem known to exist with such conventional PCD compacts is that they are vulnerable to thermal degradation when exposed to elevated temperatures during cutting and/or wear applications. It is believed that this is due, at least in part, to the presence of residual solvent/catalyst material in the microstructural interstices which, due to the differential that exists between the thermal expansion characteristics of the interstitial solvent metal catalyst material and the thermal expansion characteristics of the intercrystalline bonded diamond, is thought to have a detrimental effect on the performance of the PCD compact at high temperatures. Such differential thermal expansion is known to occur at temperatures of about 400° C. and is believed to cause ruptures in the diamond-to-diamond bonding which may eventually result in the formation of cracks and chips in the PCD structure. The chipping of or cracking in the PCD table may degrade the mechanical properties of the cutting element comprising the PCD table or lead to failure of the cutting element during drilling or cutting operations thereby rendering the PCD structure unsuitable for further use.

As used herein, a "rake side" of a tool insert is the side comprising a "rake face", which is the surface or surfaces of the tool over which the chips flow in use. As used herein, "chips" are the pieces of workpiece removed from the work surface by a machine tool in use. As used herein, a "cutting edge" is the edge of a rake face intended to perform cutting.

As used herein, "machining" is the selective removal of material from a body, called a workpiece. Sawing and cutting are examples of machining operations.

The invention claimed is:

1. A method of making a shaped tool component comprising polycrystalline diamond (PCD), comprising the steps:

a. Adding a diamond feed stock to a refractory cup;

b. Adding a pre-shaped cemented carbide body to the refractory cup adjacent the diamond feed stock;

c. Compacting the diamond feed stock and cemented carbide body to form a green body, wherein the compacting occurs at a temperature in the range of 1300° C. and 1500° C. and a pressure in the range of 5 GPa to 8 GPa and wherein a quantity of catalyst present during compacting is insufficient for complete sintering;

d. Outgassing the green body;

e. Sintering, subsequent to and separate from the compacting, the green body at a temperature between 1400° C. to 2100° C. and at a pressure of at least 7 GPa, for at least 30 seconds to form a sintered PCD precursor body that comprises a PCD table sinter-joined to the cemented carbide substrate at an interface;

f. Slicing longitudinally into the sintered PCD precursor body to produce one or more sliced portions of the sintered PCD precursor body, each sliced portion being a tool blank;

g. Removing one of said tool blanks from the remainder of the sintered PCD precursor body; and h. Shaping said tool blank into a shaped tool component, in which the thickness of the PCD table in the shaped tool component varies at two or more locations spaced apart laterally on the cemented carbide substrate.

2. A method as claimed in claim 1, in which the thickness of the PCD table in the shaped tool component is between 2 and 20 mm.

3. A method as claimed in claim 1, in which the interface in lateral cross-section comprises a series of interconnected interface segments, the interface segments being any of the following: arcuate, linear, rectilinear.

4. A method as claimed in claim 1, in which the tool blank is planar.

5. A method as claimed in claim 1, in which the tool blank is rectangular cuboidal.

6. A method as claimed in claim 1, in which the tool blank is parallelpiped.

7. A method as claimed in claim 1, in which shaping the tool blank comprises forming a tool profile.

8. A method as claimed in claim 7, in which shaping the tool blank comprises forming a tool profile on or in at least one surface or peripheral edge of the tool blank.

9. A method as claimed in claim 8, in which the tool profile is arranged on or in a peripheral surface of the PCD table.

10. A method as claimed in claim 8, in which the tool profile is arranged wholly within a footprint of the tool blank.

11. A method as claimed in claim 7, in which the tool profile in lateral cross-section comprises a series of interconnected profile segments, the profile segments being any of the following: arcuate, linear, rectilinear, sawtooth, sinusoidal.

12. A method as claimed in claim 1, in which the step of shaping the cemented carbide body and/or the tool blank comprises EDM cutting.

13. A method as claimed in claim 1, in which shaping the cemented carbide body and/or the tool blank comprises laser cutting.

14. A method as claimed in claim 1, comprising shaping the tool blank into an insert for a circular saw.

15. A method as claimed in claim 1, comprising shaping the tool blank into an insert for a dressing wheel.

16. A method as claimed in claim 1, in which the sintered PCD precursor body is cylindrical.

17. A method as claimed in claim 2, in which the interface in lateral cross-section comprises a series of interconnected interface segments, the interface segments being any of the following: arcuate, linear, rectilinear.

18. A method as claimed in claim 2, in which the tool blank is one of planar, rectangular cuboidal, and parallelpiped.

19. A method as claimed in claim 3, in which the tool blank is one of planar, rectangular cuboidal, and parallelpiped.

* * * * *